(12) United States Patent
Mian et al.

(10) Patent No.: US 10,677,683 B2
(45) Date of Patent: Jun. 9, 2020

(54) PRESSURE PROFILING SYSTEM

(71) Applicant: International Electronic Machines Corporation, Troy, NY (US)

(72) Inventors: Zahid F. Mian, Loudonville, NY (US); Bruce McKenney, Selkirk, NY (US); Ryk E. Spoor, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 1864 days.

(21) Appl. No.: 14/172,949

(22) Filed: Feb. 5, 2014

(65) Prior Publication Data

US 2016/0011074 A1    Jan. 14, 2016

Related U.S. Application Data

(60) Provisional application No. 61/849,908, filed on Feb. 5, 2013.

(51) Int. Cl.
*G01M 9/06* (2006.01)
*G01L 15/00* (2006.01)

(52) U.S. Cl.
CPC .............. *G01M 9/06* (2013.01); *G01L 15/00* (2013.01)

(58) Field of Classification Search
CPC .................................. G01M 9/06; G01L 15/00
USPC ...................... 73/170.01, 170.02; 702/33, 50
See application file for complete search history.

(56) References Cited

U.S. PATENT DOCUMENTS

| | | | |
|---|---|---|---|
| 7,127,948 B2 | 10/2006 | Tavares et al. | |
| 7,249,501 B2 | 7/2007 | Sawada | |
| 7,284,420 B2 | 10/2007 | Rouse et al. | |
| 7,788,981 B2 | 9/2010 | Schmid et al. | |
| 7,845,236 B2 | 12/2010 | Zheng et al. | |
| 2004/0194300 A1 | 10/2004 | Schoess et al. | |
| 2006/0155818 A1* | 7/2006 | Odenwald et al. | 709/208 |
| 2007/0018083 A1* | 1/2007 | Kumar | G01B 11/18 250/227.14 |
| 2007/0095160 A1* | 5/2007 | Georgeson | G01N 29/0645 73/866 |
| 2007/0118301 A1* | 5/2007 | Andarawis et al. | 702/33 |
| 2008/0167833 A1* | 7/2008 | Matsen | G01N 29/14 702/122 |
| 2009/0300379 A1 | 12/2009 | Mian et al. | |
| 2010/0054916 A1 | 3/2010 | Zheng et al. | |
| 2010/0180701 A1 | 7/2010 | Daniel et al. | |

(Continued)

OTHER PUBLICATIONS

NPL article "Online Distributed Sensor Selection" by Daniel Golovin, Matthew Faulkner, and Andreas Krause, dated Apr. 2010. (Year: 2010).*

(Continued)

*Primary Examiner* — Leslie J Evanisko (74) *Attorney, Agent, or Firm* — LaBatt, LLC (57) ABSTRACT

A solution for acquiring pressure data for an object, such as an airfoil, is provided. One or more pressure sensor nodes are utilized, each of which includes a set of pressure sensors and a processing component. The pressure sensor node(s) are affixed to the object in a manner that enables the pressure sensors to acquire pressure data for a set of locations on the surface of the object. A pressure sensor node also can include a wireless communications component to provide wireless communications between the pressure sensor node and a computer system.

21 Claims, 7 Drawing Sheets

(56) References Cited

U.S. PATENT DOCUMENTS

2011/0224846 A1* 9/2011 Simon ................ B64C 3/48
 701/3
2011/0300880 A1* 12/2011 Muller ............... G01S 5/0289
 455/456.1
2012/0048024 A1 3/2012 Kurtz et al.

OTHER PUBLICATIONS

Ahn, PCT Search Report for PCT Application No. US2014014760, dated May 27, 2014, 14 pages.
Scanivalve, Model ZOC17 Temperature Compensated Electronic Pressure Scanning Module, Data Sheet No. G447, copyright 2012, 4 pages.
MSP430 Ultra-Low-Power Microcontrollers, copyright 2014, 25 pages.
Nordic Semiconductor 2.4GHz RF, 2 pages.
Infinite Power Solutions, Inc.,copyright 2014, 4 pages.
Powercast RF Energy Harvesting and Wireless Power for Low-Power Applications, copyright 2012, 22 pages.
Montoya et al., "Comparision of Wing Pressure Distribution from Flight Tests of Flush and External Orifices for Mach Nos. from 0.50 to 0.97", Apr. 1975, 25 pages.
Measurement Endeavors, copyright 2007, 2 pages.
Measurement Specialties MS5607-02BA03 Barometric Pressure Sensor with stainless steel cap, copyright 2012, 19 pages.
General Electronics Battery Co., LTD. Product Specification for Polymer Lithium-in Battery, Model No. PGEB014461, copyright 2007, 7 pages.
PowerStream Ultrathin Rechargeable Lithium Polymer Batteries from PowerStream, copyright 2014, 3 pages.
Nordic Semiconductor nRF51822 Bluetooth low energy and 2.4GHz proprietary SoC, copyright 2014, 3 pages.
Measurement Specialties MS761 Pressure Sensor Die (0-1 bar), copyright 2012, 5 pages.

* cited by examiner

PRESSURE PROFILING SYSTEM

REFERENCE TO RELATED APPLICATIONS

The current application claims the benefit of U.S. Provisional Application No. 61/849,908, titled "Wireless Pressure Profiling System," which was filed on 5 Feb. 2013, and which is hereby incorporated by reference.

TECHNICAL FIELD

The disclosure relates generally to pressure profiling, and more particularly, to an improved solution for obtaining pressure data.

BACKGROUND ART

Current approaches for obtaining pressure and other information from the flow of air over airfoils and other surfaces utilize "port" holes in the airfoil surface. From these holes, individual tubes convey the pressure to a central location. The tubes, pressure registration components, and other data-acquisition devices are complex, weighty, and require clear space for routing them through the airfoil. Moreover, such runs of tubing and connections have a myriad of potential failure points, including pinched tubes, holes, seal leaks, faulty electrical connections, etc. Installation of such a pressure-measurement system also can require a significant amount of labor. As a result, for pressure profiling a model of a commercial aircraft, for example, the cost for the test can exceed half a million dollars for this portion of the work alone.

Other approaches seek to utilize pressure-sensitive films applied to wings. These films provide qualitative data, but cannot provide accurate quantitative data as to the pressure distribution and behavior. Additionally, a responsiveness of the films is limited, and permanent data acquisition using the films is challenging to implement.

One approach proposes a pressure-sensing method, which incorporates sensing channels for a fluid connected to "pressure-sensing modules." Data from these modules is described as being provided to a "signal processing" module via wired or wireless connection. Moreover, the approach places units having varying heights from three to ten millimeters on an existing airfoil. At higher wind speeds, millimeter-scale deviations are significant, especially on smaller airfoils such as are used in testing and development models. In particular, as wind speeds increase, a maximum allowable deviation decreases drastically. For example, even at speeds of only forty meters per second (about ninety miles per hour), a "trip"—a piece of tape with widely spaced sandy grit of about 0.75 mm in diameter embedded on it—produces very noticeable changes in turbulent versus laminar flow when applied to a leading wing edge. These changes are at least in part due to an irregular profile of the trip. Small deviations on the scale of a millimeter, or even up to three millimeters, may be acceptable for profiles that are very smooth and under the right circumstances.

Another approach proposes a flat pressure sensor device which runs miniature resin pipes to a pressure converter and measurement device inside a wing. As with previous approaches, this approach proposes placement of a millimeter-scale object in the airflow, and utilizes multiple tubes, each of which presents a potential point of failure or mis-manufacture. Still another approach uses pressure belts, which are flat sensor modules three millimeters thick adhered to a surface of an aircraft. These pressure belts can provide reasonable performance, but require wired power and data connections, each of which provides an additional point of failure and requires direct modification of the airfoil.

SUMMARY OF THE INVENTION

The inventors recognize various limitations in the approaches proposed to date. As described herein, the inventors provide a solution for obtaining pressure and other information from the flow of air over airfoils and other surfaces which solves one or more problems in the prior art approaches. Aspects of the invention provide a solution for acquiring pressure data for an object, such as an airfoil. One or more pressure sensor nodes are utilized, each of which includes a set of pressure sensors and a processing component. The pressure sensor node(s) are affixed to the object in a manner that enables the pressure sensors to acquire pressure data for a set of locations on the surface of the object. A pressure sensor node also can include a wireless communications component to provide wireless communications between the pressure sensor node and a computer system.

A first aspect of the invention provides a system comprising: an object; and a pressure sensor node affixed to the object, the pressure sensor node comprising: a substrate; a set of pressure sensors mounted to the substrate; a processing component mounted to the substrate and operatively connected to the set of pressure sensors; and a wireless communications component mounted to the substrate and operatively connected to the processing component, wherein the pressure sensor node is affixed to the object in a manner that enables the set of pressure sensors to acquire data corresponding to a pressure at a set of locations on a surface of the object, and wherein the processing component is configured to receive data from the set of pressure sensors and communicate pressure data corresponding to the pressure at the set of locations to a computer system using the wireless communications component.

A second aspect of the invention provides a pressure sensor node comprising: a flexible substrate; a plurality of pressure sensors mounted to the substrate, wherein the pressure sensor node is configured to be affixed to an object in a manner that enables the plurality of pressure sensors to acquire data corresponding to a pressure at a plurality of locations on a curved surface of the object; a processing component mounted to the substrate and operatively connected to the plurality of pressure sensors, wherein the processing component is configured to selectively process data from only a subset of the plurality of pressure sensors; and a communications component mounted to the substrate and operatively connected to the processing component, wherein the communications component is configured to communicate with a computer system.

A third aspect of the invention provides a method of acquiring pressure data for an object, the method comprising: affixing a pressure sensor node to a surface of the object, wherein the pressure sensor node includes: a substrate; a set of pressure sensors mounted to the substrate, wherein the affixing enables the set of pressure sensors to acquire data corresponding to a pressure at a set of locations on a surface of the object; a processing component mounted to the substrate and operatively connected to the set of pressure sensors; and a wireless communications component mounted to the substrate and operatively connected to the processing component, wherein the wireless communications component is configured to communicate with a computer system using a wireless transmission solution; the processing component receiving data from the set of pressure sensors; and the wireless communications component communicating pressure data corresponding to the pressure at the set of locations for processing on a computer system.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for acquiring pressure data for an object, such as an airfoil. One or more pressure sensor nodes are utilized, each of which includes a set of pressure sensors and a processing component. The pressure sensor node(s) are affixed to the object in a manner that enables the pressure sensors to acquire pressure data for a set of locations on the surface of the object. A pressure sensor node also can include a wireless communications component to provide wireless communications between the pressure sensor node and a computer system. As used herein, unless otherwise noted, the term "set" means one or more (i.e., at least one) and the phrase "any solution" means any now known or later developed solution.

Figure 1:
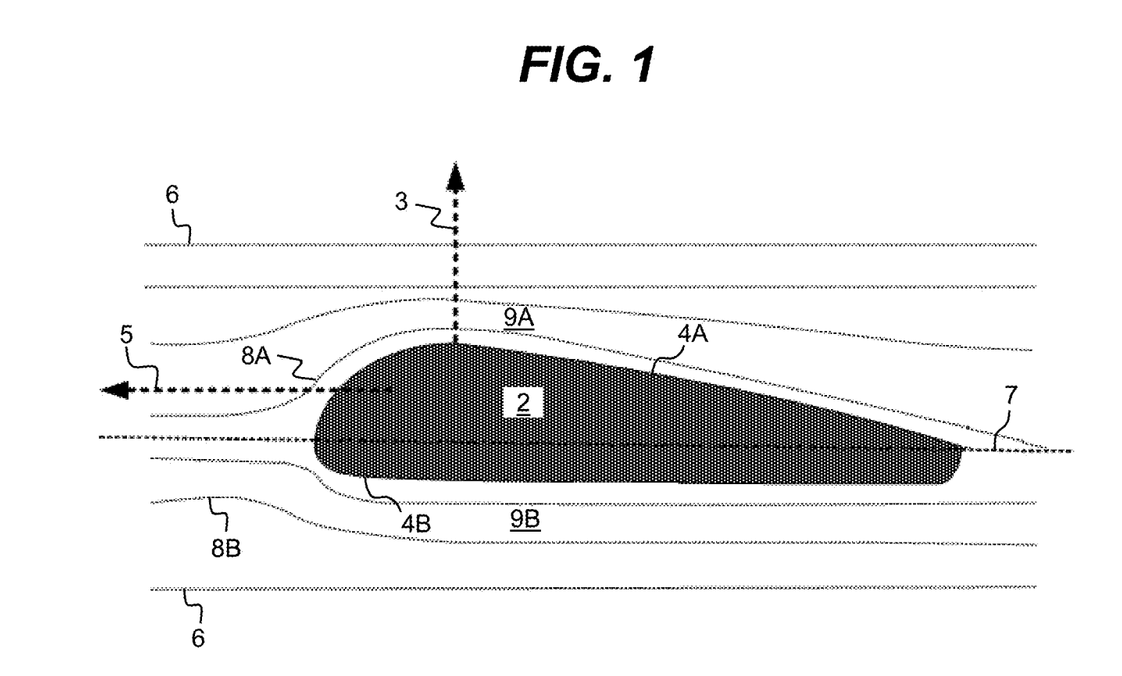
FIG. 1 illustrates basic principles of aerodynamics relevant to a pressure profiling system.

Turning to the drawings, FIG. 1 illustrates basic principles of aerodynamics relevant to a pressure profiling system described herein. In particular, FIG. 1 illustrates the evaluation of pressure for a body (e.g., an airfoil) 2, which is designed to generate lift 3 when moving through a fluid (e.g., air) in a direction 5. As is widely understood, a stationary body 2 placed in a fluid stream moving in a direction opposite of the direction 5 will generate the same lift 3. To this extent, the pressure measurements described herein are derived from the relative motion of the body 2 and the corresponding fluid, and can be applied to either application as well as applications resulting from a combination of motion by the body 2 and fluid. Additionally, it also is understood that the body 2 is only illustrative of various objects for which pressure measurements can be acquired.

Regardless, the fluid has a standard pressure, which is illustrated by the straight lines 6. As the body 2 moves relative to the fluid, the fluid is displaced, resulting in some fluid 8A passing over an upper surface 4B of the body 2 while some fluid 8B passes over a lower surface 4B of the body 2. The region at which the upper and lower airflows split is referred to as the streamline 7. The upper surface 4A and the lower surface 4B of the body 2 have shapes that cause the fluid 8A passing over the upper surface 4A to travel a greater distance than the fluid 8B passing over the lower surface 4B. As the body 2 passes both streams of displaced fluid 8A, 8B in the same period of time, the fluid is attenuated and a pressure in a region 9A above the body 2 is lowered, while a pressure in a region 9B below the body 2 is ambient or higher. The pressure differential generates the lift 3.

A common application for a pressure profiling system is to acquire data corresponding to the exact location and extent of the pressure differentials in the lower pressure region 9A and/or in the higher pressure region 9B. The data can be used to generate pressure profiles for the body 2, which are of use in the design of airfoils and other streamlined bodies for use in various fluids, such as diving planes of submarines, automobile bodies, missile bodies, and/or the like.

Figure 2:
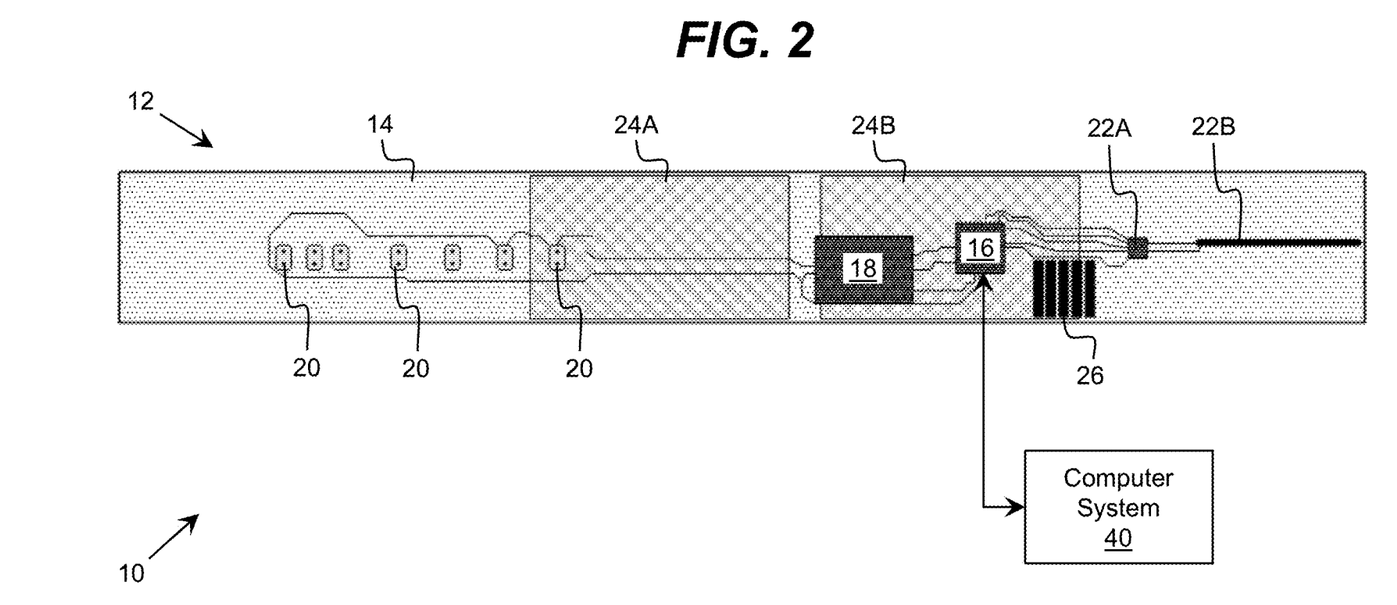
FIG. 2 shows an illustrative system including a pressure sensor node according to an embodiment.

An embodiment provides a pressure sensor node including multiple extremely low-profile pressure sensors for acquiring pressure data. For example, FIG. 2 shows an illustrative system 10 including a pressure sensor node 12 according to an embodiment. The sensor node 12 comprises a substrate 14 on which various components are assembled. In an embodiment, the substrate 14 is a very thin, flexible substrate. For example, the substrate 14 can be a tough polymer having a thickness of a small number of mils. In a more particular embodiment, the substrate 14 is an FR-4 grade glass-reinforced epoxy laminate sheet having a thickness less than or equal to approximately five mils. However, it is understood that any type of material of any thickness, which is capable of supporting the components described herein and/or having a comparable flexibility can be utilized.

The pressure sensor node 12 includes a processing component 16, which receives and processes pressure data from a set of pressure sensors 20 and a storage component 18, which is capable of storing data relating to pressure. In an embodiment, the processing component 16 comprises an ultra-low power microcontroller, such as a MSP-430 series microcontroller from Texas Instruments. The storage component 18 can comprise one or more of various types of memory chips capable of storing any target amount of data. In an embodiment, the storage component 18 includes one or more data storage chips that utilize a data storage technology that does not require power to retain data. In a more particular embodiment, the storage component 18 includes one or more NAND flash memory chips.

The set of pressure sensors 20 can comprise any type of pressure sensors 20. In an embodiment, the set of pressure sensors 20 includes one or more extremely low-profile pressure sensors. For example, the set of pressure sensors 20 can be selected such that a vertical profile of the sensor node 12 is approximately two millimeters or less. An illustrative pressure sensor includes a MS5607 barometric pressure sensor provided by Measurement Specialties, which has a vertical profile of approximately one millimeter. The set of pressure sensors 20 can include multiple pressure sensors 20, which are spaced according to a particular pattern. To provide a useful pressure profile for an object, it is desirable to measure the pressure at particular locations along the object. The pattern can be selected to provide a desired pressure profile, e.g., by conforming to a known symmetry of airflow over a target object for which the pressure sensor node 12 will be utilized. Selection of a particular spacing and pattern for a target object can be readily performed by one of ordinary skill in the art.

The pressure sensor node 12 can include various other components based on a particular implementation and/or a desired set of functionality. For example, the sensor node 12 can be configured to communicate with another computer system 40 using a wired and/or wireless transmission solution. For example, the sensor node 12 can include a wireless communications component 22A (e.g., a transceiver) and an antenna 22B. In an embodiment, the wireless communications component 22A is an ultra low power wireless communications device. For example, the wireless communications component 22A can comprise a 2.4 gigahertz (GHz) radio frequency (RF) transceiver available from Nordic Semiconductor, or the like. The antenna 22B can be inlaid into the substrate 14 using, for example, a standard board fabrication solution, be applied afterward using a commercial or custom design, and/or the like. In an alternative embodiment, the antenna 22B can be implemented apart from the sensor node 12. For example, the antenna 22B can be applied as a flat patch on a surface of an object being evaluated or the surface of the object, when fabricated of an appropriate material, can function as the antenna 22B.

In an embodiment, the pressure sensor node 12 includes a power component. For example, the power component can include one or more power storage components 24A, 24B, such as micro-energy cells. The power storage components 24A, 24B can be extremely thin and/or flexible. In a more particular embodiment, the power storage components 24A, 24B can be Thinergy batteries available from Infinite Power Solutions or ultrathin cells available from PowerStream Technology. The power storage components 24A, 24B can be configured to provide sufficient power to enable the pressure sensor node 12 to independently operate for one or more (e.g., many) hours without re-charging or replacement of the power storage components 24A, 24B. In an embodiment, the total power requirements for the pressure sensor node 12 can be within the low milliwatt (mW) range, e.g., less than approximately two milliwatts average power, with a peak power of approximately forty milliwatts.

Furthermore, the power component can include a recharging interface 26, which can enable the power storage components 24A, 24B to be re-charged using any solution. For example, the recharging interface 26 can comprise a physical recharging contact, a wireless recharging component (e.g., magnetic or electromagnetic near-field coupling), an electromagnetic recharging component (e.g., such as one offered by Powercast, Inc.), and/or the like. Use of a wireless recharging component can allow the pressure sensor node 12 to operate indefinitely without requiring removal or replacement of batteries or physical contact with a recharging component. In an alternative embodiment, the sensor node 12 is implemented without an onboard energy storage component (e.g., battery), which can reduce an overall thickness of the sensor node 12 and/or the cost of the sensor node 12.

For example, the sensor node 12 can receive power from a power source available on the object being tested or can be powered by a constant wireless energy transmission system (e.g., such as one offered by Powercast, Inc.), which can include a chipset configured to provide milliwatt-scale power for operating the various components of the sensor node 12 by converting wireless electromagnetic energy to useful power.

It is understood that the pressure sensor node 12 is only illustrative of various configurations of pressure sensor nodes described herein. To this extent, a pressure sensor node can have any shape and include a combination of various components that may be laid out in any of various ways and selected from a wide variety of vendors. Such selections can be made by one of ordinary skill in the art based on a set of target applications for the pressure sensor node. In an embodiment, the pressure sensor node 12 is: self-contained, with all power, processing, data storage, and transmission capabilities being included on board. In this case, the pressure sensor node 12 can be utilized to gather pressure data over significant periods, process the data, and store the data on board or transmit the data in real-time and/or on demand for further processing by another computer system 40. When used to evaluate an object, the performance of the corresponding object being monitored (e.g., an airfoil) is minimally impacted by the presence of the pressure sensor node 12 and the pressure data can be reliably gathered and stored for further processing.

Figure 3:
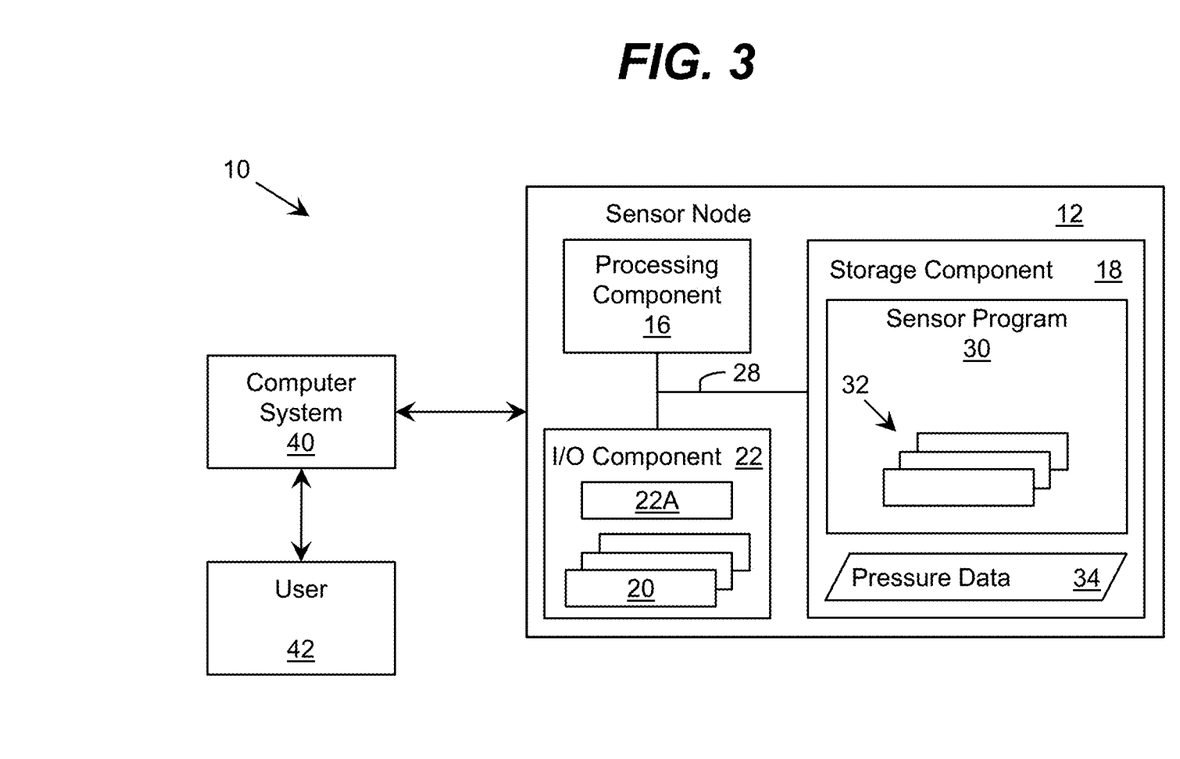
FIG. 3 shows a block diagram of an illustrative system including a pressure sensor node according to another embodiment.

FIG. 3 shows a block diagram of an illustrative system 10 including a pressure sensor node 12 according to another embodiment. As illustrated, the sensor node 12 includes a processing component 16 (e.g., one or more processors), a storage component 18 (e.g., a storage hierarchy), an input/output (I/O) component 22 (e.g., one or more I/O interfaces and/or devices), and a communications pathway 28. In general, the processing component 16 executes program code, such as sensor program 30, which is at least partially fixed in the storage component 18. While executing program code, the processing component 16 can process data, which can result in reading and/or writing transformed data from/to the storage component 18 and/or the I/O component 22 for further processing, e.g., by the computer system 40. The pathway 28 provides a communications link between each of the components in the sensor node 12. The I/O component 22 can comprise one or more devices, which enable the sensor node 12 to interact with the operating environment, such as the pressure sensor(s) 20 described herein. Additionally, the I/O component 22 can include one or more devices, such as the wireless communications component 22A described herein, which enable the sensor node 12 to communicate with one or more additional computing devices, such as the computer system 40. It is understood that the I/O component 22 also can include one or more devices, which enable a human user 42 to interact directly with the sensor node 12.

The sensor program 30 (e.g., one or more modules 32 included therein) can be configured to enable the sensor node 12 to receive data corresponding to pressure from each pressure sensor 20, perform any desired processing on the data, and store the processed data as pressure data 34 using any solution. Furthermore, the sensor program 30, when executed by the processing component 16, can manage a set of interfaces (e.g., graphical user interface(s), application program interface, and/or the like) that enable human users 42 and/or other computer systems 40 to interact with the sensor program 30. To this extent, the sensor program 30, when executed by the processing component 16, can perform one or more actions in response to a detected event (e.g., an elapsed time, an amount of stored pressure data 34, a request from the computer system 40, and/or the like). The actions can include any combination of various actions including, for example: transmitting some or all of the pressure data 34 for processing by the computer system 40; deleting some or all of the pressure data 34; starting/stopping acquiring pressure data 34; performing diagnostics; updating one or more modules 32 of the sensor program 30; providing data regarding a malfunctioning component; and/or the like.

In an illustrative embodiment, the sensor program 30, when executed by the processing component 16, can control the operation of the sensor node 12, including directing communications with the computer system 40, performing system tasks, acquiring and processing pressure data 34, and/or the like, in a manner that provides an extremely low-power consumption operational mode. In a more particular embodiment, the computer system 40 and/or the sensor node 12 are implemented as a processing node and/or a sensor node, respectively, as shown and described in U.S. patent application Ser. No. 12/469,167, filed on 20 May 2009, which is hereby incorporated by reference.

In any event, the computer system 40 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the sensor program 30 can be embodied as any combination of system software and/or application software.

Furthermore, the sensor program 30 can be implemented using a set of modules 32. In this case, a module 32 can enable the corresponding computer system (e.g., the sensor node 12) to perform a set of tasks used by the sensor program 30, and can be separately developed and/or implemented apart from other portions of the sensor program 30. As used herein, the term "component" means any configuration of hardware, with or without software, which implements the functionality described in conjunction therewith using any solution, while the term "module" means program code that enables a computer system to implement the actions described in conjunction therewith using any solution. When fixed in a storage component 18 of a computer system that includes a processing component 16, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the system 10.

It is understood that the sensor node 12 and the sensor program 30 are only representative of various possible equivalent computer systems that may perform a process described herein. To this extent, in other embodiments, the functionality provided by the sensor node 12 and the sensor program 30 can be at least partially implemented by one or more computing devices that include any combination of general and/or specific purpose hardware with or without program code. In each embodiment, the hardware and program code, if included, can be created using standard engineering and programming techniques, respectively.

Regardless, it is understood that while a wireless communications device 22A is described herein, the computer system 40 and sensor node 12 can communicate over any type of communications link. Furthermore, while performing a process described herein, the computer system 40 and/or sensor node 12 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

Figures 4A, 4B:
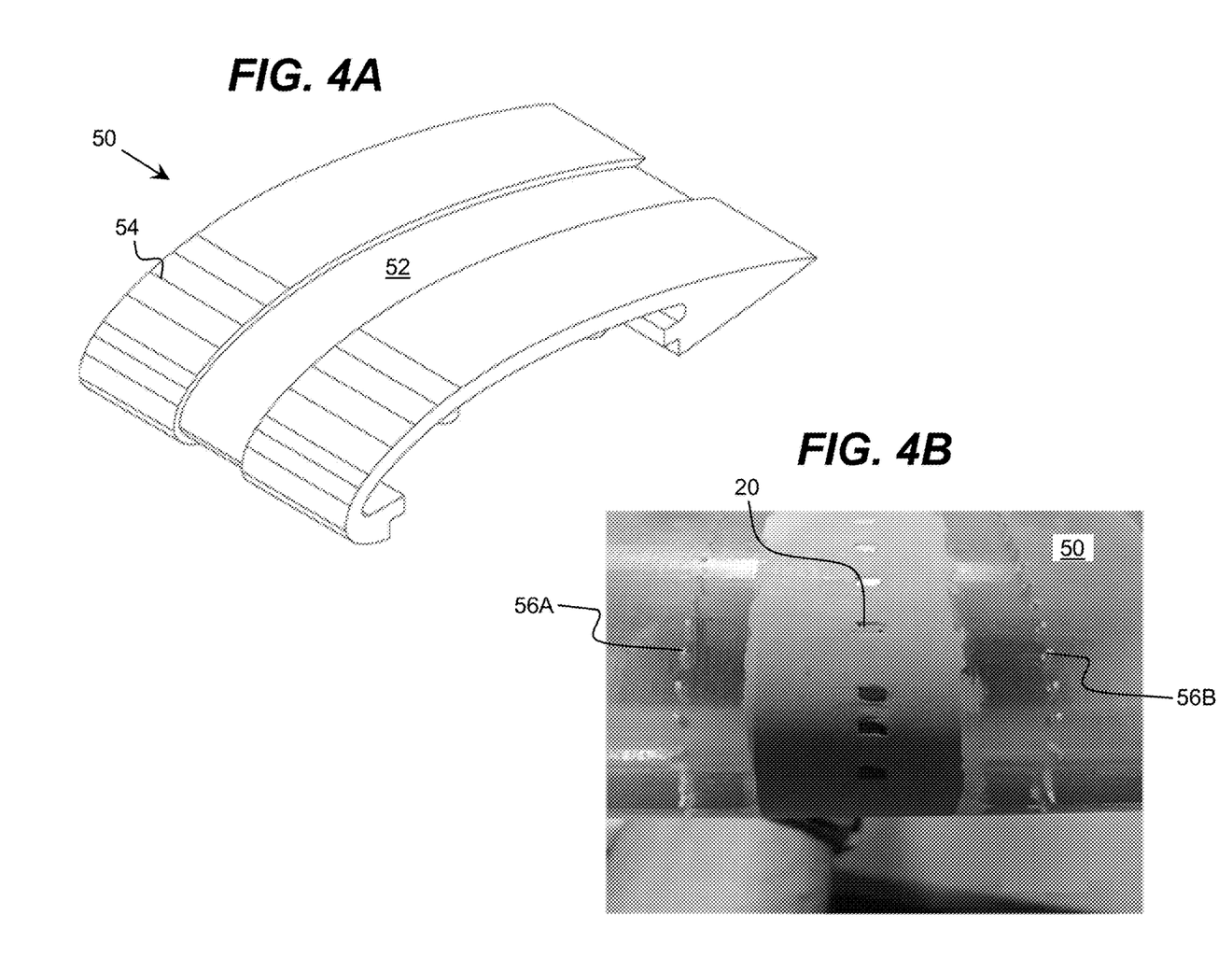
FIGS. 4A and 4B show an illustrative test object configured for evaluation using a sensor node described herein according to an embodiment.

As discussed herein, the sensor node 12 can be fabricated with an extremely low profile to minimize any disturbance to the fluid resulting from the presence of the sensor node 12. In an embodiment, the sensor node 12 is inlaid into a surface to be monitored to further reduce any disturbance to the fluid due to the presence of the sensor node 12. For example, FIGS. 4A and 4B show an illustrative test object 50 configured for evaluation using a sensor node 12 (FIG. 2) according to an embodiment. As shown in FIG. 4A, a surface of the test object 50 (e.g., an airfoil segment) includes a groove 52 which is capable of fitting the sensor node 12. In an embodiment, the groove 52 has one or more dimensions (e.g., depth, width, and length) substantially equal to the corresponding dimensions of the sensor node 12. By having a low profile as described herein, the sensor node 12 can reduce the required depth, thereby reducing a change in the weight of the test object 50 as a result of installation of the sensor node 12. The sensor node 12 and/or test object 50 can be designed such that a set of measurement locations 54 on the test object substantially (e.g., exactly) correspond with a spacing pattern of a set of pressure sensors 20 (FIG. 2) on the sensor node 12.

As shown in FIG. 4B, after locating the sensor node 12 within the groove 52 (FIG. 4A), the sensor node 12 can be coated and the surface of the test object 50 with the coated sensor node 12 can be smoothed so that only the tops of the pressure sensors 20 are exposed. The material used to coat the sensor node 12 can comprise any type of conformal coating material, such as a putty which hardens during curing. An illustrative material comprises a polyurethane conformal coating, such as HumiSeal 1A33 provided by Chase Electronic Coatings. In this manner, only a minimal disturbance to the fluid flow will result from the sensor node 12 being installed on the test object 50, which can permit use of the sensor node 12 without interfering in the aerodynamic effects of the test object 50 at even very small scales.

Figure 5:
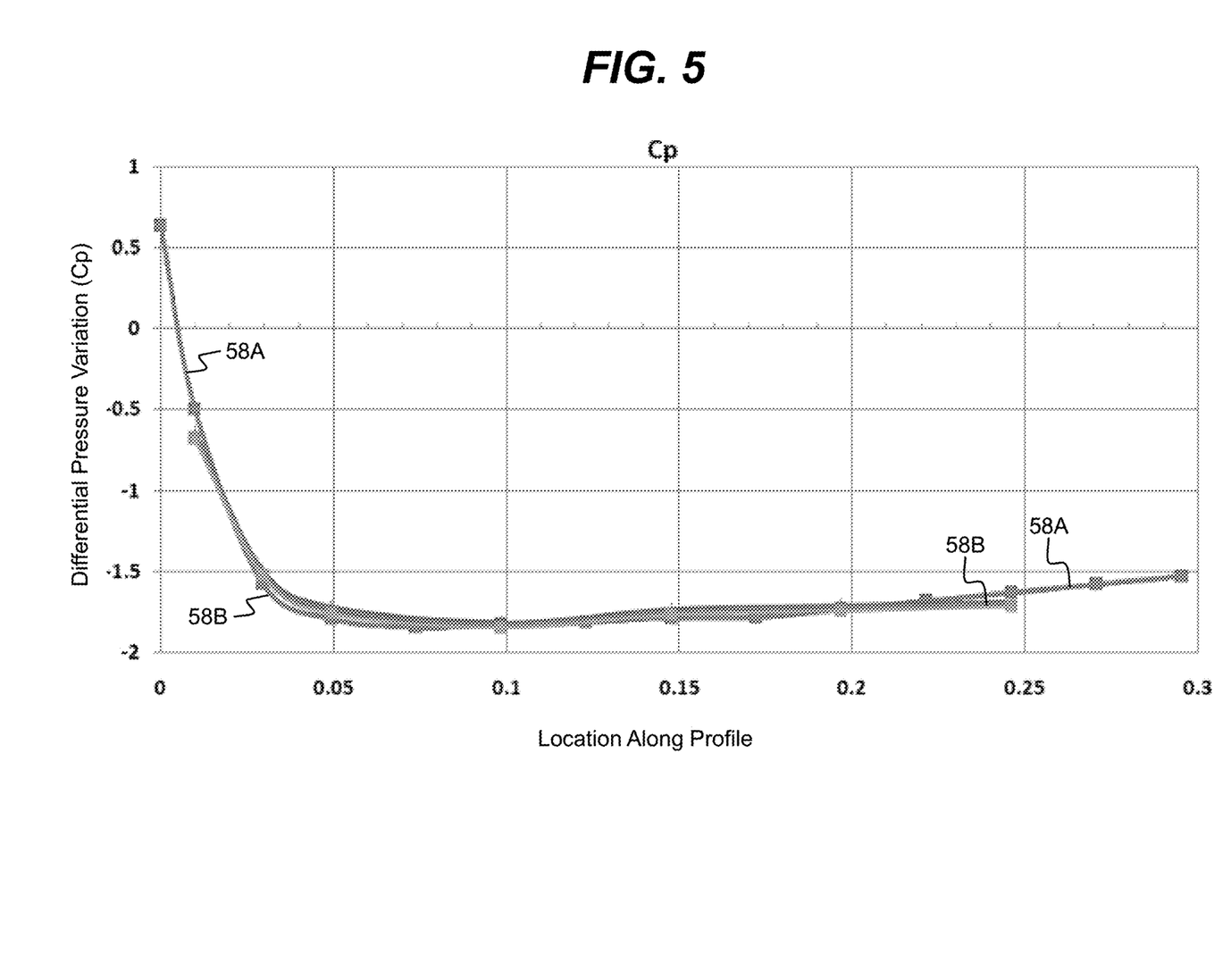
FIG. 5 shows a graph comparing the pressure coefficient, Cp, derived from pressure data obtained using a conventional measurement system and a sensor node described herein according to an embodiment.

In an experimental implementation, the sensor node 12 was installed on a test object 50 including a plurality of standard pressure ports 56A, 56B. A fluid flow test was performed on the test object 50 and pressure data acquired by the sensor node 12 and the standard pressure ports 56A, 56B were compared to evaluate the performance of the sensor node 12. FIG. 5 shows a graph comparing the pressure coefficient, Cp, derived from pressure data obtained using a conventional measurement system 58A and a sensor node 12 described herein 58B according to an embodiment. As illustrated, the results of the two measurement approaches are in close agreement for the various locations along the profile at which both types of sensors were located.

Use of one or more sensor nodes 12 described herein can provide one or more advantages over previous approaches. For example, previous approaches require multiple physical connections between the surface of the object being evaluated (e.g., an airfoil) and pressure-measurement systems located within the object. Other approaches have passed these connections through a side of a wind tunnel. In either approach, long stretches of pressure tubing and wires for conveying pressure and providing power to the measurement system are required. As a result, these approaches have added considerable mass, require a complex, costly installation and maintenance, and have multiple points of failure. The sensor nodes 12 described herein can reduce or eliminate one or more of these limitations. Unlike many previous approaches, a sensor node 12 described herein can be configured to acquire, process, and store pressure data without immediately transmitting the data or transferring the data to another computer system. Such an ability can be useful in various applications, for example, where wireless communications may interfere with other operating systems, the security or stealth of an operation may suffer as a result of such communications, and/or the like.

A sensor node 12 described herein also can have a lower profile and longer operating time than previous approaches. Use of flexible materials, including flexible batteries, in conjunction with the lower profile can enable the sensor node 12 to be configured to conform with surface profiles of even quite significant curvature. Additionally, use of batteries rechargeable via a wireless solution and/or use of a wireless power solution can permit even longer periods of operation of the sensor node 12 without requiring physical access to the battery.

Figure 6:
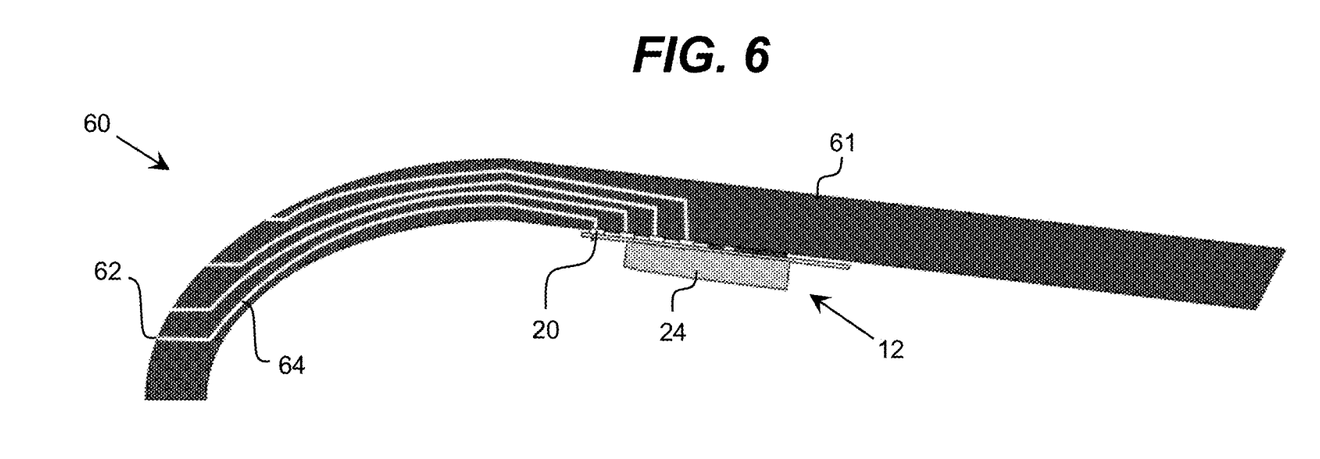
FIG. 6 shows an illustrative installation of a sensor node on a test object according to another embodiment.

As shown in FIGS. 4A and 4B, the sensor node 12 can be installed on a test object 50 such that the set of pressure sensors 20 are located at the surface of the test object 50. However, it is understood that this is only illustrative of various possible installation configurations. For example, FIG. 6 shows an illustrative installation of a sensor node 12 on a test object 60 according to another embodiment. In this case, a surface 61 (e.g., "skin") of the test object 60 includes a set of openings 62 and corresponding channels 64. Each opening 62 can be located at a location on the surface 61 of the test object 60 for which pressure data is desired. Each channel 64 can provide a passageway through the surface 61 of the test object 60, which terminates a location of a pressure sensor 20 of the sensor node 12. The sensor node 12 is installed on an interior side of the surface 61 in a manner such that the set of pressure sensors 20 are aligned with the interior end points of the set of channels 64. Using this installation configuration, a sensor node 12 having a standardized design can be utilized to obtain pressure data for various locations on various test objects 60 without requiring modification to the relative locations of the set of pressure sensors 20.

The opening(s) 62 and channel(s) 64 can be formed using any solution, e.g., a current manufacturing technique and rapid prototyping. The channel(s) 64 can be included in even a very thin test object 60 with minimal impact on its structural strength. In an embodiment, the set of channels 64 are approximately two millimeters deep. While the test object 60 is shown including multiple openings 62 and channels 64 displaced vertically with respect to one another, it is understood that the openings 62 and channels 64 can be separated horizontally or vertically along the surface 61 in any combination that can acquire the desired pressure data.

Using a mounting configuration such as that shown in FIG. 6, one or more modifications can be made to the design of the sensor node 12 described herein. For example, as the sensor node 12 is mounted on an interior side of the surface 61 of the test object 60, a thickness of the sensor node 12 may be less of a concern. As a result, a sensor node 12 can include a larger power storage component 24 and/or a larger storage component 18 (FIG. 2), which can provide for a longer operating life for the sensor node 12. Furthermore, the set of pressure sensors 20 can be affixed to an opposing side of the substrate as one or more of the other components. Additionally, the power storage component 24 can include a power harvesting unit, which can acquire energy, e.g., from vibration of the test object 60. Still further, the surface 61 can have an antenna incorporated therein, or a wireless data collection system (e.g., computer system 40 of FIG. 2) can be located on the interior of the test object 60. This approach can provide a pressure data acquisition solution having a general reduced complexity, far fewer points of failure, and long-term operating capability, while allowing for a standardized design of the sensor node 12 and minimal modification of the test object 60 itself.

In another embodiment, a sensor node described herein can be implemented as a flexible device configured to be applied to a surface of an object, such as an airfoil. In this case, the sensor node can have an overall height sufficiently small and/or smooth so as to not impact an overall pressure profile of the object in an unacceptable manner. In a more particular embodiment, such a sensor node is implemented as a sensor tape node having a flexible substrate with an adhesive surface and an overall height of less than or equal to approximately one millimeter.

Figure 7A:
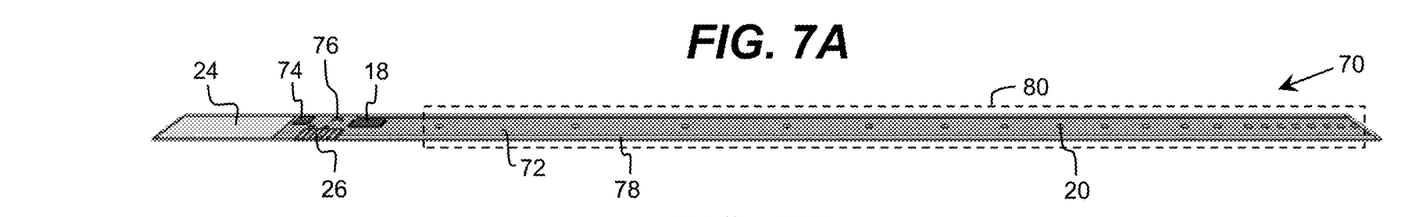
FIGS. 7A-7C show perspective and side views of an illustrative sensor tape node according to an embodiment.
Figures 7B, 7C:
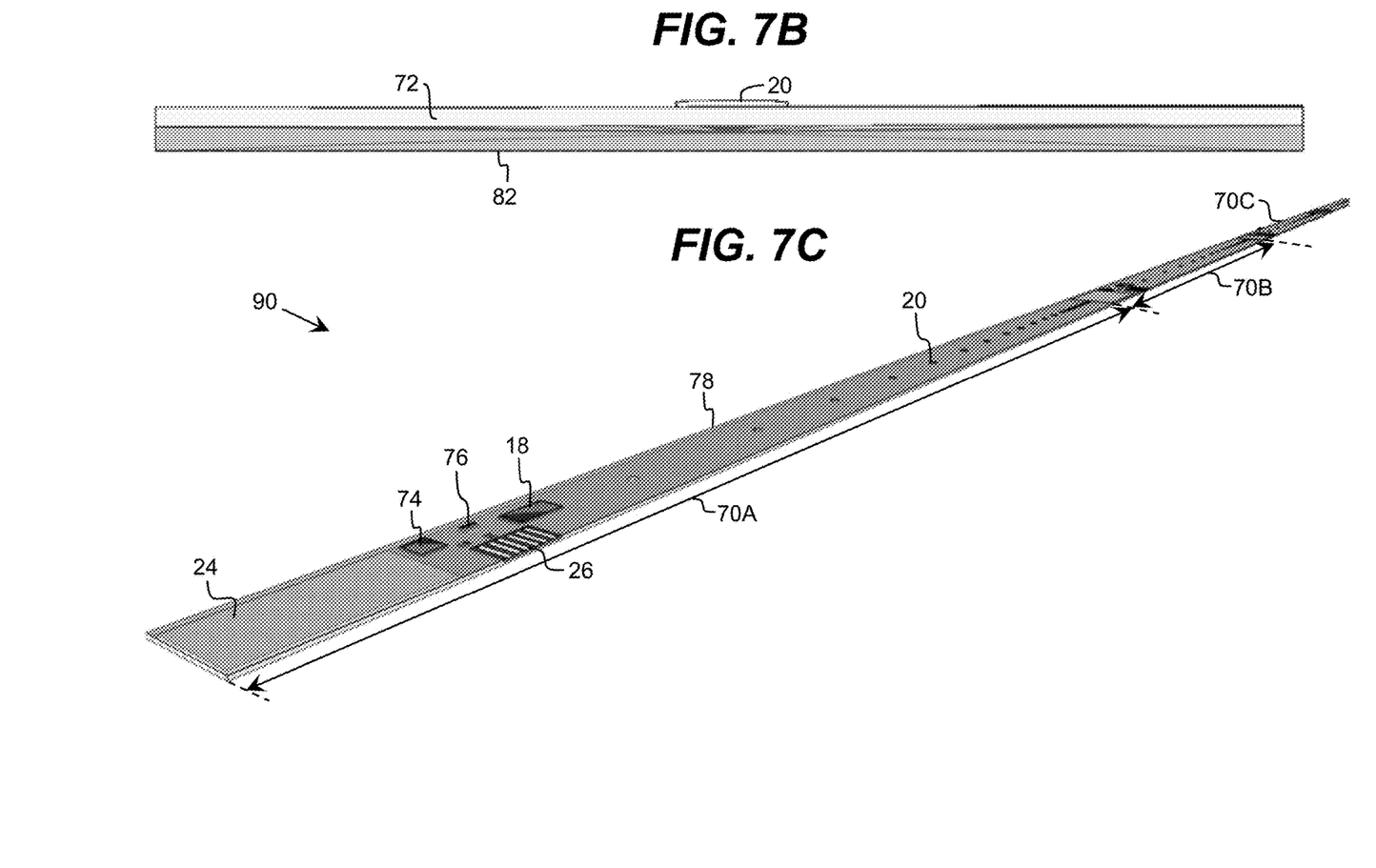

FIGS. 7A-7C show perspective and side views of an illustrative sensor tape node 70 according to an embodiment. The sensor tape node 70 includes a thin encapsulant 72, which supports and protects various components included in the sensor tape node 70. In an embodiment, the encapsulant 72 includes a thin substrate (e.g., an epoxy laminate sheet) on which the various components are mounted and a coating (e.g., a conformal coating material), which is applied over the various components and the substrate. The components can provide similar functionality for the sensor tape node 70 as described herein in conjunction with other sensor node embodiments. However, the particular components incorporated within the sensor tape node 70 will need to be capable of being located in a sensor tape node 70 having an overall height of one millimeter or less. To this extent, one or more of the components may be a die-level component, as opposed to a pre-packaged electronic component, which often has larger dimensions than the die(s) functioning therein.

Regardless, the sensor tape node 70 can include a combined processing and transceiver component 74 (e.g., such as a nRF51822 chip provided by Nordic, which combines a 2.4 GHz transceiver with a Cortex MO processor), a storage component 18 (e.g., a data storage die), and a power component 24 (e.g., battery), each of which can be configured as described herein. Additionally, the sensor tape node 70 can include a power harvesting component 76, which can obtain power for recharging the power component 24 from, for example, radio frequency power, near-field magnetic sources, electromagnetic sources, and/or the like. The sensor tape node 70 also can include a recharging interface 26, which can comprise very low-profile physical contacts for recharging the power component 24. An antenna 78 also can be included on the sensor tape node 70, which can be configured in any manner, e.g., encircling a perimeter of the sensor tape node 70.

The sensor tape node 70 includes a set of very low-profile pressure sensors 20, such as the MS761 pressure sensors provided by Measurement Specialties, which can have a height as low as 0.6 millimeters. The sensor tape node 70 can include multiple pressure sensors 20, which can collectively form a sensor array 80. As shown most clearly in FIG. 7B, the various components can be fully embedded in the encapsulant 72, except for a top surface of each pressure sensor 20, which can allow variations in pressure to reach the sensing chamber located inside the pressure sensor 20. A bottom surface of the sensor tape node 70 can include an adhesive 82, which enables the sensor tape node 70 to be affixed to a surface of an object. In an embodiment, the adhesive 82 has a thickness of less than five microns. Illustrative adhesives 82 include thin epoxy adhesives, such as Hysol EA 956 offered by Henkel Corporation. As the sensor tape node 70 can be fabricated with a high degree of flexibility, multiple sensor tape nodes 70A-70C can be produced and provided in a form factor similar to conventional tape as shown in FIG. 7C. In particular, multiple sensor tape nodes 70A-70C can be included on a single roll 90. In another embodiment, a roll 90 can include only a plurality of pressure sensors 20 forming one or more sensor arrays 80. In this case, a number of pressure sensors 20 to be included in an implementation can be selected and removed from the roll 90, and subsequently connected to the various other components, which are implemented apart from the roll 90, e.g., via low profile physical contacts or the like.

As described herein, it may be desirable to enable the collection of pressure data for different spacings of measurement points for an object or different objects without requiring precise placement of a sensor node described herein and/or modification of the sensor node. Depending on the size and dimensions of an object, the precise nature of the test, placement of the sensor node, and other factors there may be considerable variation in the spacing of pressure sensors desired. In an embodiment, the sensor tape node 70 includes a plurality of closely spaced pressure sensors 20. For example, the sensor tape node 70 can include one or more rows of pressure sensors 20 having a center to center spacing less than five times a radius of each pressure sensor. In a particular embodiment, the sensor tape node 70 includes pressure sensors 20 having diameters of three millimeters and a center to center spacing of five millimeters. In a more particular embodiment, the closely spaced pressure sensors 20 on the sensor tape node 70 extend along a length between ten centimeters up to approximately three meters (e.g., approximately 20 to 600 pressure sensors 20). However, it is understood that any length and spacing of pressure sensors 20 can be utilized.

In this case, the sensor tape node 70 can be affixed to a surface of an object such that the pressure sensors 20 extend across a region of interest on the object (e.g., a leading edge of an airfoil). A user 42 (FIG. 3), e.g., via a computer system 40 (FIG. 3) in communication with the sensor tape node 70, can individually identify a subset of the pressure sensors 20 for which data is to be processed by the processing component (e.g., the combined processing and transceiver component 74) during operation of the sensor tape node 70. For example, the sensor tape node 70 can include visual indications (e.g., markings, color changes, etc.) identifying the locations and identifications of one or more of the pressure sensors 20, which the user 42 can use to individually select a subset of the pressure sensors 20 that are present in locations of interest on the object. When configured to reuse, the sensor tape node 70 can enable a previously used subset to be reused or cleared to enable a user 42 to select an entirely new subset of the pressure sensors 20. In this manner, the sensor tape node 70 can be utilized in any of a variety of possible spacing configurations for sampling pressure data. Furthermore, should a pressure sensor 20 fail, the computer system 40 can commence processing data received from one or more adjacent pressure sensors 20, which may be able to provide sufficient data for a given test.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
an object; and
a pressure sensor node affixed to the object, the pressure sensor node comprising:
a substrate configured to be affixed to the object;
a set of pressure sensors mounted to the substrate, wherein the set of pressure sensors includes a plurality of pressure sensors;
a processing component mounted to the substrate and operatively connected to the set of pressure sensors; and
a wireless communications component mounted to the substrate and operatively connected to the processing component, wherein the pressure sensor node is affixed to the object in a manner that enables the set of pressure sensors to acquire data corresponding to a pressure at a set of locations on a surface of the object, and wherein the processing component is configured to receive data from each pressure sensor in the set of pressure sensors, selectively process data received from only a subset of the set of sensors, and communicate pressure data corresponding to the pressure at at least some of the set of locations to a computer system using the wireless communications component.

2. The system of claim 1, wherein the substrate comprises a flexible substrate, and wherein the pressure sensor node is affixed to a curved surface of the object.

3. The system of claim 1, wherein the set of pressure sensors includes a plurality of closely spaced pressure sensors.

4. The system of claim 1, wherein the pressure sensor node is located in a groove in a surface of the object, the groove having dimensions sufficient to fit the pressure sensor node.

5. The system of claim 4, wherein the pressure sensor node is coated such that only a top portion of each of the set of pressure sensors is exposed on the surface of the object.

6. The system of claim 1, wherein the pressure sensor node is affixed to an interior side of a surface of the object, wherein an exterior side of the surface of the object includes a set of openings corresponding to the set of locations, and wherein an opening in the set of openings is connected to a location of a pressure sensor of the pressure sensor node via a channel.

7. The system of claim 1, wherein the pressure sensor node further includes a power component mounted to the substrate and operatively connected to the processing component, wherein the power component is configured to provide sufficient power for independently operating the pressure sensor node for at least one hour without recharging.

8. The system of claim 1, further comprising a computer system configured to evaluate the object using pressure data acquired by the pressure sensor node, wherein the wireless communications component is configured to communicate with the computer system using a wireless transmission solution.

9. A pressure sensor node comprising:
a flexible substrate;
a plurality of pressure sensors mounted to the substrate, wherein the pressure sensor node is configured to be affixed to an object in a manner that enables the plurality of pressure sensors to acquire data corresponding to a pressure at a plurality of locations on a curved surface of the object;
a processing component mounted to the substrate and operatively connected to the plurality of pressure sensors, wherein the processing component is configured to receive data from each of the plurality of pressure sensors and selectively process data received from only a subset of the plurality of pressure sensors; and
a communications component mounted to the substrate and operatively connected to the processing component, wherein the communications component is configured to communicate with a computer system for at least one of: receiving data identifying the subset of the plurality of pressure sensors or providing pressure data for processing by the computer system.

10. The pressure sensor node of claim 9, further comprising a power component mounted to the substrate and operatively connected to the processing component, wherein the power component is configured to provide sufficient power for independently operating the pressure sensor node for at least one hour without re-charging.

11. The pressure sensor node of claim 10, wherein the power component includes:
a set of flexible power storage components; and
a wireless recharging interface for re-charging the set of flexible power storage components.

12. The pressure sensor node of claim 9, wherein the pressure sensor node has a vertical profile less than one millimeter, and wherein the pressure sensor node further includes an adhesive on a bottom surface of the pressure sensor node.

13. The pressure sensor node of claim 9, further comprising an antenna mounted to the substrate and operatively connected to the communications component.

14. The pressure sensor node of claim 9, wherein the pressure sensor node is configured to operate on an average of less than ten milliwatts of power, and wherein the pressure sensor node has a vertical profile less than two millimeters.

15. The pressure sensor node of claim 9, further comprising a storage component mounted to the substrate and operatively connected to the processing component, wherein the processing component is further configured to store pressure data corresponding to the pressure at the subset of locations in the storage component and transmit pressure data for processing by the computer system in response to a detected event.

16. A method of acquiring pressure data for an object, the method comprising:
affixing a pressure sensor node to a surface of the object, wherein the pressure sensor node includes:
a substrate;
a set of pressure sensors mounted to the substrate, wherein the affixing enables the set of pressure sensors to acquire data corresponding to a pressure at a set of locations on a surface of the object, wherein the set of pressure sensors includes a plurality of pressure sensors;
a processing component mounted to the substrate and operatively connected to the set of pressure sensors; and
a wireless communications component mounted to the substrate and operatively connected to the processing component, wherein the wireless communications component is configured to communicate with a computer system using a wireless transmission solution;
the processing component receiving data from each pressure sensor in the set of pressure sensors;
the processing component only processing data received from a selected subset of the plurality of pressure sensors; and
the wireless communications component communicating pressure data corresponding to the pressure at at least a portion of the set of locations for processing on a computer system.

17. The method of claim 16, wherein the substrate comprises a flexible substrate, and wherein the pressure sensor node is affixed to a curved surface of the object.

18. The method of claim 17, wherein the pressure sensor node is located in a groove in a surface of the object, the groove having dimensions sufficient to fit the pressure sensor node, the method further including coating the pressure sensor node such that only a top portion of each of the set of pressure sensors is exposed on the surface of the object.

19. The method of claim 17, further including the processing component receiving data identifying the selected subset of the plurality of pressure sensors.

20. The method of claim 16, wherein the pressure sensor node is affixed to an interior side of a surface of the object, the method further including:
forming a set of openings on an exterior side of the surface corresponding to the set of locations; and
forming a channel in the surface of the object, wherein the channel connects an opening in the set of openings to a location of a pressure sensor of the pressure sensor node.

21. The method of claim 16, wherein the pressure sensor node further includes a storage component operatively connected to the processing component, wherein the communicating the pressure data is performed in response to a detected event.

* * * * *

UNITED STATES PATENT AND TRADEMARK OFFICE
CERTIFICATE OF CORRECTION

PATENT NO. : 10,677,683 B2
APPLICATION NO. : 14/172949
DATED : June 9, 2020
INVENTOR(S) : Zahid F Mian, Bruce McKenney and Ryk E. Spoor It is certified that error appears in the above-identified patent and that said Letters Patent is hereby corrected as shown below:

On the Title Page

The Assignee should be "International Electronic Machines Corporation, Troy, NY (US)".

Signed and Sealed this
Fourth Day of August, 2020

Andrei Iancu
*Director of the United States Patent and Trademark Office*